(12) United States Patent
Schroeder et al.

(10) Patent No.: US 8,376,617 B2
(45) Date of Patent: Feb. 19, 2013

(54) SNAP-IN BEARING INSERT

(75) Inventors: Jonathan R. Schroeder, Roscoe, IL (US); Ming Sun, Crystal Lake, IL (US)

(73) Assignee: Pacific Bearing Company, Rockford, IL (US)

( * ) Notice: Subject to any disclaimer, the term of this patent is extended or adjusted under 35 U.S.C. 154(b) by 1202 days.

(21) Appl. No.: 11/696,601

(22) Filed: Apr. 4, 2007

(65) Prior Publication Data
US 2008/0247693 A1 Oct. 9, 2008

(51) Int. Cl.
*F16C 3/00* (2006.01)
*F16C 33/02* (2006.01)

(52) U.S. Cl. ............ 384/97; 384/296; 384/315

(58) Field of Classification Search ........... 384/29, 384/42, 97, 98, 275, 276, 280, 281, 291, 384/295, 296, 297, 299, 300, 906, 287, 294, 384/429, 430, 434
See application file for complete search history.

(56) References Cited

U.S. PATENT DOCUMENTS

| | | | | |
|---|---|---|---|---|
| 356,332 A * | 1/1887 | Randolph | | 384/297 |
| 949,910 A * | 2/1910 | Perkins | | 384/296 |
| 1,652,468 A * | 12/1927 | Catlin | | 384/296 |
| 2,381,270 A * | 8/1945 | Enz | | 384/98 |
| 3,008,779 A * | 11/1961 | Spriggs | | 384/299 |
| 3,362,765 A * | 1/1968 | Pierce | | 384/125 |
| 3,383,142 A * | 5/1968 | Scott | | 384/295 |
| 3,455,613 A * | 7/1969 | McGrath | | 384/97 |
| 3,637,273 A * | 1/1972 | Orndorff, Jr. | | 384/97 |
| 3,771,846 A * | 11/1973 | Bass et al. | | 384/125 |
| 3,929,392 A * | 12/1975 | Ogino | | 384/215 |
| 4,324,444 A | 4/1982 | Buczynski et al. | | |
| 4,772,139 A | 9/1988 | Bretton | | |
| 4,995,734 A | 2/1991 | Schroeder | | |
| 5,013,166 A * | 5/1991 | Domer | | 384/220 |
| 5,791,787 A | 8/1998 | Nisley | | |
| 5,980,112 A * | 11/1999 | Matthews | | 384/98 |
| 6,113,275 A | 9/2000 | Blasé | | |
| 6,388,191 B1 * | 5/2002 | Maegawa | | 174/50 |
| 6,757,940 B2 * | 7/2004 | Lu et al. | | 16/330 |
| 7,415,816 B2 * | 8/2008 | Bernhard | | 53/490 |
| 2001/0033703 A1 * | 10/2001 | Martin | | 384/296 |

* cited by examiner

*Primary Examiner* — Thomas R Hannon
*Assistant Examiner* — Alan Waits
(74) *Attorney, Agent, or Firm* — Reinhart Boerner Van Deuren P.C.

(57) ABSTRACT

An improved sliding bearing apparatus and method utilize a snap-in polymer bearing insert having one or more identically shaped locking lugs, each of which are configured for locking engagement with a corresponding depression in a bearing housing, to thereby lock the bearing insert in place against relative movement either radially or axially with respect to the bearing housing. In a free-standing state, the insert may have a variety of shapes including cylindrical, non-cylindrical, or be flat and planar. An insert for a closed bearing is configured such that it may be trimmed to form an insert for an open bearing.

17 Claims, 7 Drawing Sheets

SNAP-IN BEARING INSERT

FIELD OF THE INVENTION

This invention pertains to sliding bearings for shafts and the like, and more particularly to sliding bearings incorporating snap-in polymer inserts.

BACKGROUND OF THE INVENTION

It is known to utilize a sliding or rotating bearing apparatus, including a bearing housing having a cylindrical opening extending longitudinally therethrough, in combination with a polymer bearing insert inserted into the cylindrical opening in the bearing housing, in conjunction with a shaft extending longitudinally through the bearing insert. Sliding bearing apparatuses of this type are disclosed in U.S. Pat. No. 6,113,275, to Blase, titled "Plain Bearing."

Prior bearing apparatuses, such as the ones disclosed by Blase, include a bearing body having a slit extending along the entire length of its axis, and at least deformable zone, likewise extending along the entire length of the axis, to thereby allow the slit to be open so that the bearing body can be fitted to the shaft and removed from the shaft in a radial direction. Blase discloses bearing insert configurations having a plurality of projections which lock into an annular groove in a bearing housing, to secure the insert against axial movement within the housing, in combination with another projection, which engages a through-hole in the housing to secure the bearing body against radial movement within the housing.

Experience has shown that prior bearing arrangements, and polymer bearing inserts used therein, are undesirably complex to manufacture and install. For example, the bearing inserts disclosed in Blase are more difficult than is desirable to manufacture, due to the necessity for providing multiple protrusions which act individually for locking the insert against axial and radial movement respectively within the housing. Installation of the insert of Blase is also complicated by the necessity for using a two-step process, in which the protrusions which prevent axial movement within the housing are first engaged, and then, sequentially, the protrusion precluding radial motion is engaged with the housing.

The precise requirements for shape, and location of features such as the protrusions of Blase, have significantly limited the options available for molding or otherwise fabricating prior polymer sliding bearing inserts. Also, in the past, it has typically been necessary for manufactures and service organizations to carry a large inventory of differently shaped and sized bearing inserts which could typically be used only in a single application, such as a completely closed, or an open bearing arrangement.

What is needed, therefore, is an improved sliding bearing apparatus and/or polymer bearing insert, and improved methods for constructing and using sliding bearing apparatuses or polymer bearing inserts of the type typically used therein.

BRIEF SUMMARY OF THE INVENTION

The invention provides an improved bearing apparatus and method, through the use of a snap-in polymer bearing insert having at least one locking lug that is configured for locking engagement with a corresponding depression in a bearing housing, to thereby lock the bearing insert in place against relative movement radially and axially with respect to the bearing housing. Some forms of the invention may include two or more identical locking lugs, each of which is configured to engage and interact with a corresponding depression in the housing.

In one form of the invention, a bearing insert for a sliding bearing is provided, with the bearing insert being adapted for insertion into a substantially cylindrical longitudinally oriented opening in a bearing housing, for use with a shaft extending longitudinally through the cylindrical opening in the bearing housing and having a radius, an outer diameter and a corresponding circumference of the shaft. The bearing insert includes a body of polymer material, defining a longitudinal axis of the insert, first and second axially spaced axial ends of the insert, and first and second spaced longitudinal edges of the insert which extend substantially parallel to the longitudinal axis of the insert.

The body further defines a plurality of longitudinally extending bearing segments, joined to one another by flexible webs. The bearing segments each define a radially inner and a radially outer surface thereof.

The radially inner surface of each of the bearing segments has a longitudinally extending radiused recess therein, with the radius of the radiused recess substantially matching the radius of the shaft, and being configured for bearing against a portion of the circumference of the shaft.

The radially outer surface of each of the bearing segments is formed in such a manner that, when the insert is disposed within the cylindrical opening in the bearing housing, the radially inner surfaces of the bearing segments, in combination with one another, substantially define a circumferentially interrupted bore having an internal radius substantially matching the radius of the shaft, and such that the longitudinal edges of the insert form a longitudinally extending opening therebetween.

The body further includes at least one locking lug extending substantially radially outward from the radially outer surface of one of the bearing segments, and configured for locking engagement with a corresponding depression in the bearing housing, to thereby lock the bearing insert in place against relative movement radially and axially with respect to the bearing housing. In some forms of the invention, a pair of identically configured first and second locking lugs respectively extends substantially radially outward from the radially outer surfaces of a first one of the bearing segments disposed adjacent the first longitudinal edge of the insert, and a second one of the bearing segments disposed adjacent the second longitudinal edge of the insert. Each of the first and second locking lugs is configured for locking engagement with a corresponding depression in the bearing housing, to thereby lock the bearing insert in place against relative movement radially and axially with respect to the bearing housing.

The locking lugs may have a substantially cylindrical profile, extending outward from the radially outer surface of the bearing segment. Alternatively, in some forms of the invention, the locking lugs may have a substantially semi-cylindrical profile, extending outward form the radially outer surface of the bearing segment, with a flat portion of the semi-cylindrical profile being aligned substantially parallel to and facing the adjacent longitudinal edge.

In some forms of the invention, the first one of the bearing segments, from which the first locking lug extends, may have a longitudinal edge thereof defining the first longitudinal edge of the insert. In some forms of the invention, the second one of the bearing segments, from which the second locking lug extends, may also have a longitudinal edge thereof defining the second longitudinal edge of the insert.

Where the first locking lug has a substantially semi-cylindrical profile extending outward from the radially outer surface of the first one of the bearing segments, the flat portion of the semi-cylindrical profile may be aligned substantially parallel to and face toward the first longitudinal edge.

In some forms of the invention, the first and second ones of the bearing segments are connected to adjacent bearing segments disposed between the first and second ones of the bearing segments and the longitudinal edges of the bearing insert. The first and second ones of the bearing segments are configured and connected to the adjacent bearing segments, disposed between the first and second ones of the bearing segments in the longitudinal edges of the insert, in such a manner that some of the adjacent segments between the longitudinal edges of the first and second ones of the bearing segments may be removed to form an open bearing insert having the longitudinal edges defined by the distal edges of the remaining ones of the bearing segments, with the longitudinal edges forming a longitudinally extending gap therebetween.

In some forms of the invention, a bearing insert, according to the invention, substantially assumes a cylindrical form in a free-standing state, even when not inserted into the cylindrical opening in the bearing housing. In other forms of the invention, the bearing insert may be configured to substantially assume a non-cylindrical form in a free-standing state, when not inserted into the cylindrical opening in the bearing housing. A bearing insert, having a non-cylindrical form, according to the invention, may substantially assume a flat planar form in a free-standing state, when not inserted into the cylindrical opening in the bearing housing.

The invention may also take the form of a bearing apparatus including a bearing housing having a cylindrical opening extending substantially longitudinally therethrough and a pair of depressions extending substantially radially outward from the cylindrical opening, in combination with a bearing insert according to the invention. The locking lugs of the bearing insert and the corresponding depressions in the bearing housing may have cooperative substantially cylindrical profiles. Alternatively, the locking lugs of the bearing insert and the corresponding depressions in the bearing housing may have cooperative substantially semi-cylindrical profiles, in other forms of the invention.

The invention may also take the form of a method for constructing, utilizing, or replacing a bearing insert, according to the invention, or a method for constructing, utilizing, or repairing a bearing apparatus, according to the invention.

Other aspects, objectives and advantages of the invention will be apparent from the following description and accompanying drawings of exemplary embodiment of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

FIGS. 1, 2, 5, 7 and 8, show a first exemplary embodiment of a sliding bearing apparatus 100 including a bearing housing 102, having a cylindrical opening 104 extending substantially longitudinally therethrough, and a bearing insert 106 adapted for insertion into the longitudinal bore 104 in the bearing housing 102. As shown by dashed lines in FIGS. 1 and 5, the bearing housing also includes a pair of depressions, in the form of generally cylindrically shaped recesses 108, having a function described in greater detail below, with only one of the recesses 108 being visible in FIGS. 1 and 5.

The bearing insert 106 is adapted for insertion into the substantially cylindrical longitudinally oriented opening 104 in the bearing housing 102, and is configured for use with a shaft (not shown) extending longitudinally through the bearing insert 106 and the cylindrical opening 104 in the bearing housing 102, with the shaft having a radius, an outer diameter, and a corresponding circumference thereof, with the radius outer diameter and circumference of the shaft not being shown in the drawings for the sake of clarity of illustration.

Figure 5:
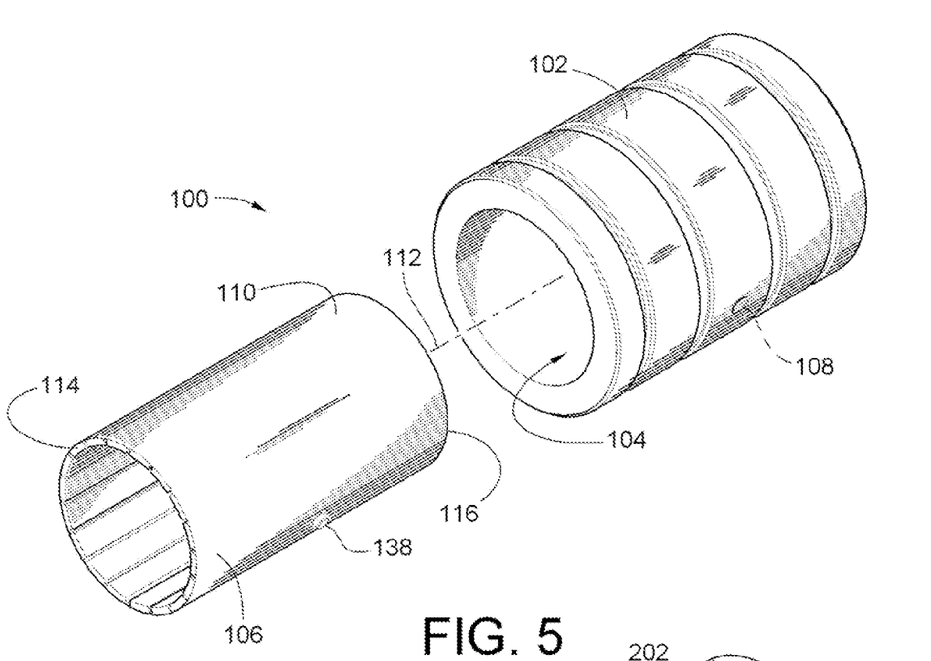
FIG. 5 is an exploded perspective view of the first exemplary embodiment of a closed, sliding bearing apparatus, as shown in FIG. 1.
Figure 7:
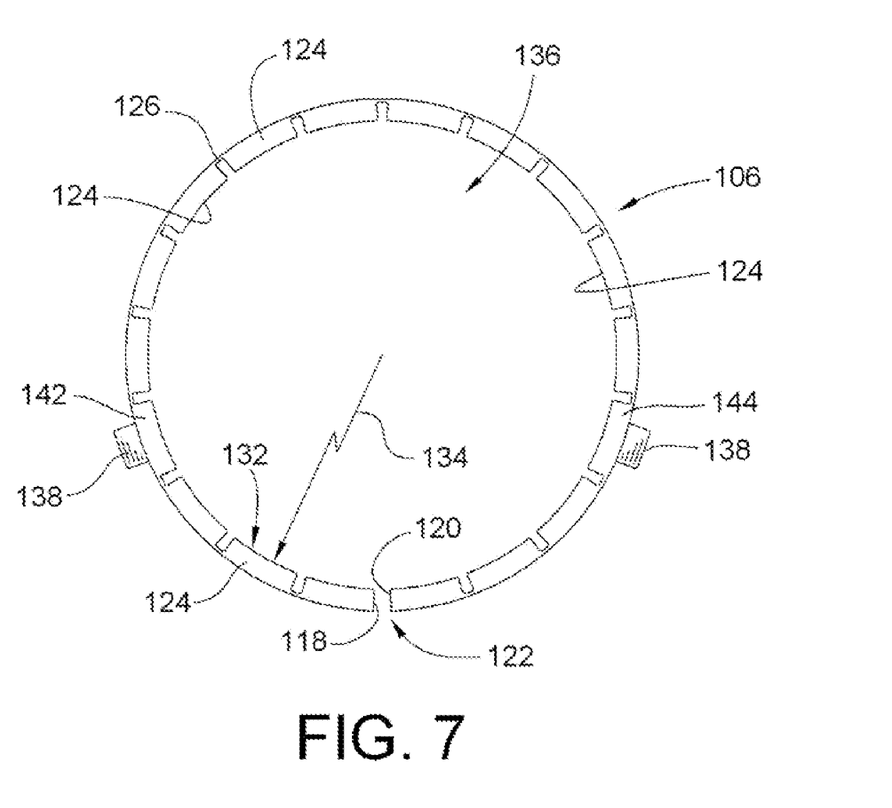
FIGS. 7 and 8 are enlarged illustrations of the bearing insert of the bearing apparatus of the exemplary embodiment shown in FIGS. 1 and 5.
Figure 8:
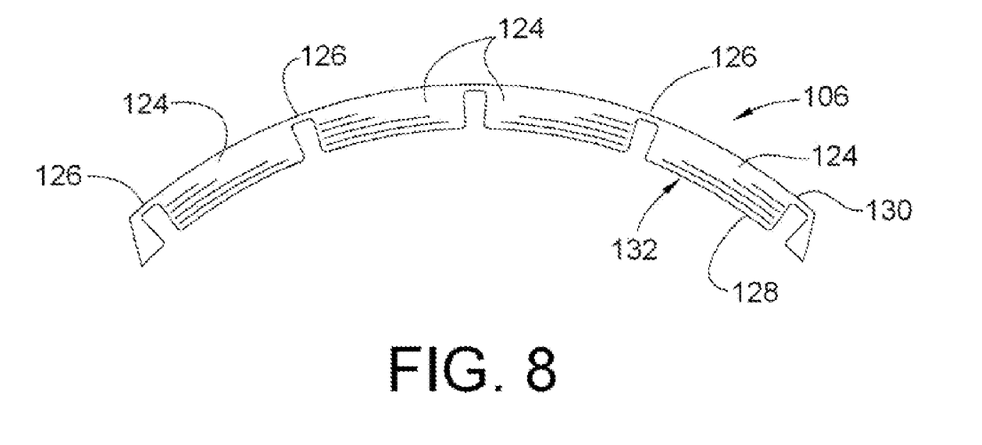

As best seen in FIGS. 5, 7 and 8, the first exemplary embodiment of the bearing insert 106 has a unitary body 110 of an appropriate polymer material, defining a longitudinal axis 112 of the insert 106, first and second axially spaced ends 114, 116, of the insert 106, and first and second longitudinal edges 118, 120 of the insert 106 which extend substantially parallel to the longitudinal axis 112 of the insert 106, to thereby form a longitudinally extending slot 122 in the insert 106.

As best seen in FIGS. 7 and 8, the body 110 of the insert 106 further defines a plurality of longitudinally extending bearing segments 124, joined to one another by flexible webs 126.

The bearing segments 124 each define radially inner and radially outer surfaces 128, 130 thereof. The radially inner surface 128 of each of the bearing segments 124 has a longitudinally extending radiused recess 132 therein, with each of the radiused recesses 132 having a radius 134 substantially matching the radius of the shaft, and configured for bearing against a portion of the circumference of the shaft.

The radially outer surfaces 130 of each of the bearing segments 124, is formed in such a manner that, when the insert 106 is disposed within the cylindrical opening 104 in the bearing housing 102, the radially inner surfaces 128 of the bearing segments 124, in combination with one another, substantially define a circumferentially interrupted bore 136, having an internal radius 134 substantially matching the radius of the shaft, and such that the longitudinal edges 118, 120 of the insert 106 form the longitudinally extending slot 122 therebetween.

As shown in FIGS. 5 and 7, the body 110 of the bearing insert 106 further includes a pair of identical locking lugs 138 each of which extends substantially radially outward from the radially outer surfaces 130 of a first one 142, and a second one 144 of the bearing segments 124 disposed respectively adjacent the first and second longitudinal edges 118, 122 of the insert 106. Each of the locking lugs 138 is configured for locking engagement with a corresponding one of the depressions 108 in the bearing housing 102, to thereby simultaneously lock the bearing insert 106 in place against relative movement radially and axially with respect to the bearing housing 102.

It will be understood, that each of the locking lugs 138 is configured in such a manner that it could, standing alone, lock the bearing insert 106 in place against radial and axial movement, even if the second one of the pair of locking lugs 138 were not present. The second locking lugs shown in all of the exemplary embodiments depicted in the drawings and described herein are included to illustrate that the invention can be practiced in bearing inserts having multiple locking lugs, or in embodiments having only a single locking lug. In contrast to prior inserts having multiple locking lugs, however, any one of the locking lugs of the present invention may be relied upon for locking the bearing insert against radial and axial movement within the housing. Multiple locking lugs, according to the invention, merely add further stability and the capability to withstand higher axial and radial loads on the insert.

In FIGS. 5, 7 and 8, the bearing insert 106 is depicted in a form of the invention wherein the bearing insert 106 is configured to substantially assume a cylindrical form in a free-standing state, even when the insert 106 is not inserted into the cylindrical opening 104 in the bearing housing 102. In preferred embodiments of the invention, it may be desirable to configure the bearing insert 106 in such a manner that the radially outer surfaces of the bearing segments 124 collectively define a surface having a periphery slightly larger than the circumference of the cylindrical opening 104 in the bearing housing 102, so that the bearing insert 106 will exhibit a slight snap-fit tendency when inserted into the cylindrical opening 104.

In some embodiments of the invention, the insert 106 may be configured to substantially assume a non-cylindrical form in a free-standing state, when not inserted into the cylindrical opening 104 in the bearing housing 102. Such a non-cylindrical shape may be more advantageously formed, or provide a greater snap-fit force for retaining the insert 106 within the housing 102.

With particular regard to ease of manufacturing, and to provide a substantial advantage in the form of a reduction in the space required for handling inventory, in addition to providing a form which is more readily shippable, as a spare part, for example, FIGS. 11-15 illustrate an alternate embodiment of the insert 106, in which the insert 106 substantially assumes a flat, planar form, in a free-standing state. It will be understood, by those having skill in the art, that the alternate embodiment of the insert 106 shown in FIGS. 11-15 is substantially identical to the insert 106 described above in relation to FIGS. 5, 7 and 8, except for the fact that the insert of FIGS. 5, 7 and 8 assumes a substantially cylindrical shape, while free-standing, whereas the embodiment shown in FIGS. 11-15 assumes a substantially flat, planar shape in a free-standing state. To facilitate understanding of the embodiment illustrated in FIGS. 11-15, identical reference numerals, to those utilized in FIGS. 5, 7 and 8, are applied to salient features of the embodiment shown in FIGS. 11-15.

Figure 11:
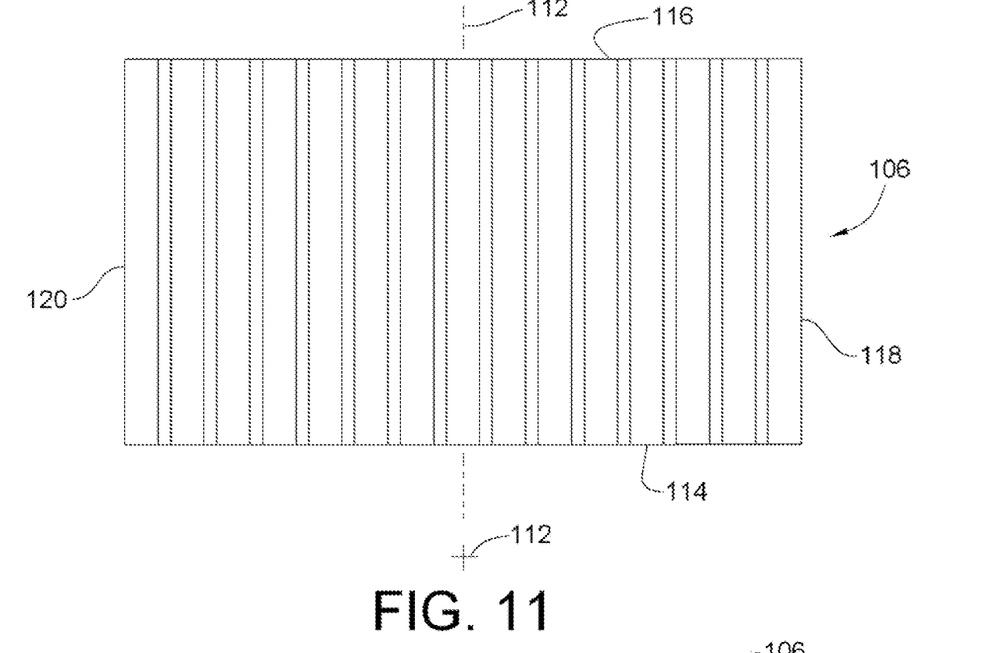
FIGS. 11-15 are various views of a variation of the bearing insert shown in FIGS. 7 and 8, in which the bearing insert is formed to have a substantially flat, planar shape, in a free-standing state thereof.
Figure 12:
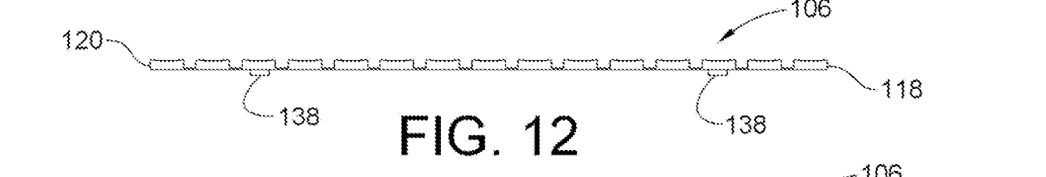
Figure 13:
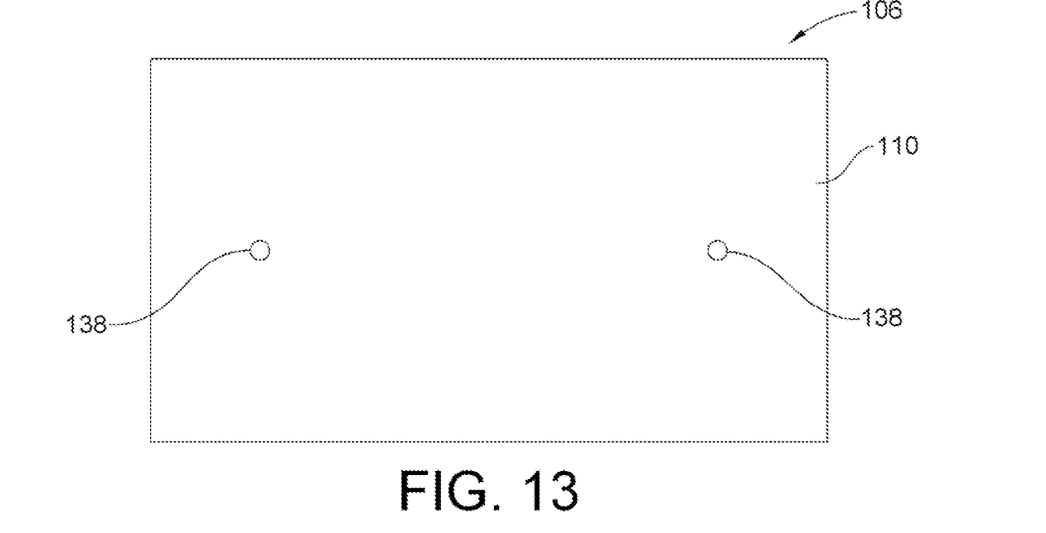
Figure 14:
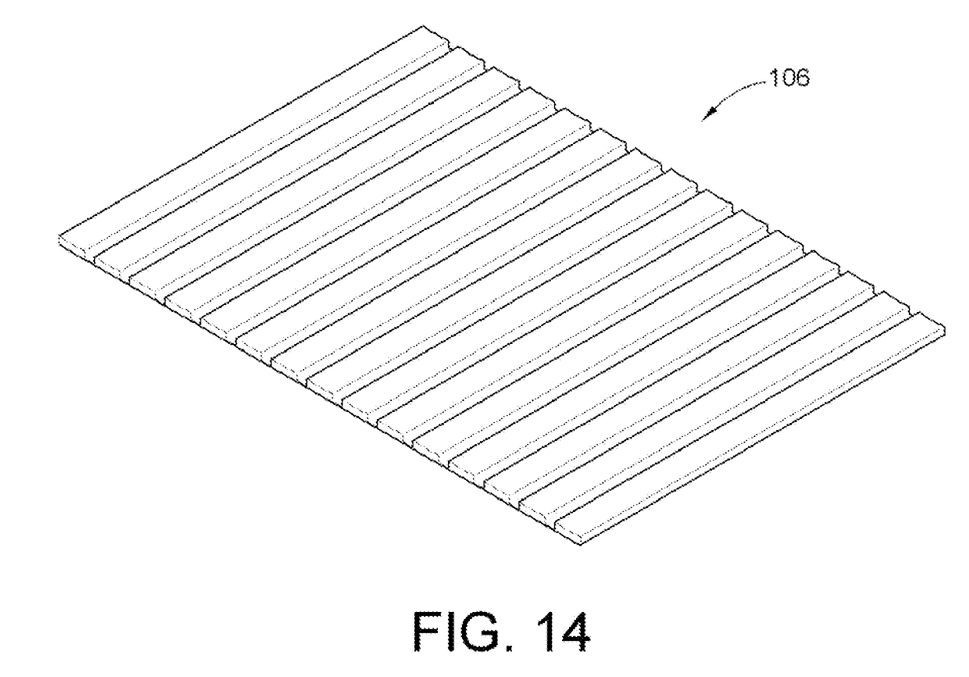
Figure 15:
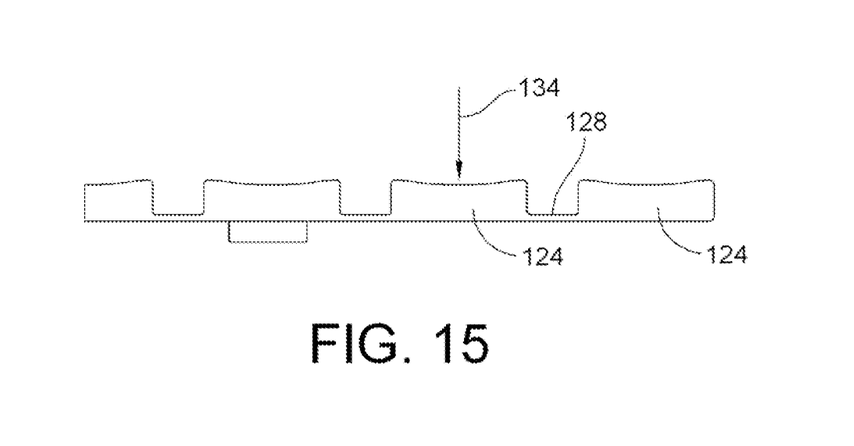

Prior to inserting the embodiment of the insert 106 shown in FIGS. 11-15 into the cylindrical opening 104, the insert 106 is rolled about its longitudinal axis 112, as indicated in FIGS. 11 and 12, into a form small enough to fit into the cylindrical opening 104 in the bearing housing 102. Once the rolled bearing insert 106 is inserted into the opening 104, it is released and allowed to expand toward its free-standing state within the cylindrical opening 104. As the insert 106 expands toward its free-standing state, it will be constrained by the cylindrical opening 104 to assume a cylindrical shape, substantially identical to the form of the insert shown in FIGS. 5, 7 and 8. The expanded insert 106 may then be manipulated within the cylindrical opening 104 to engage the locking lugs 138 with their corresponding recesses 108 in the bearing housing 102.

Figure 1:
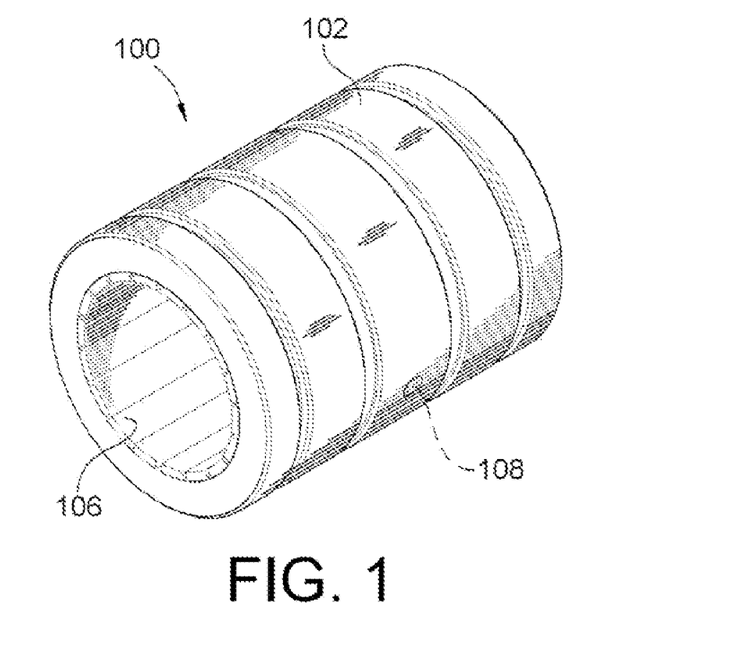
FIG. 1 is a perspective, assembled, illustration of a closed bearing apparatus, according to the invention.
Figure 2:
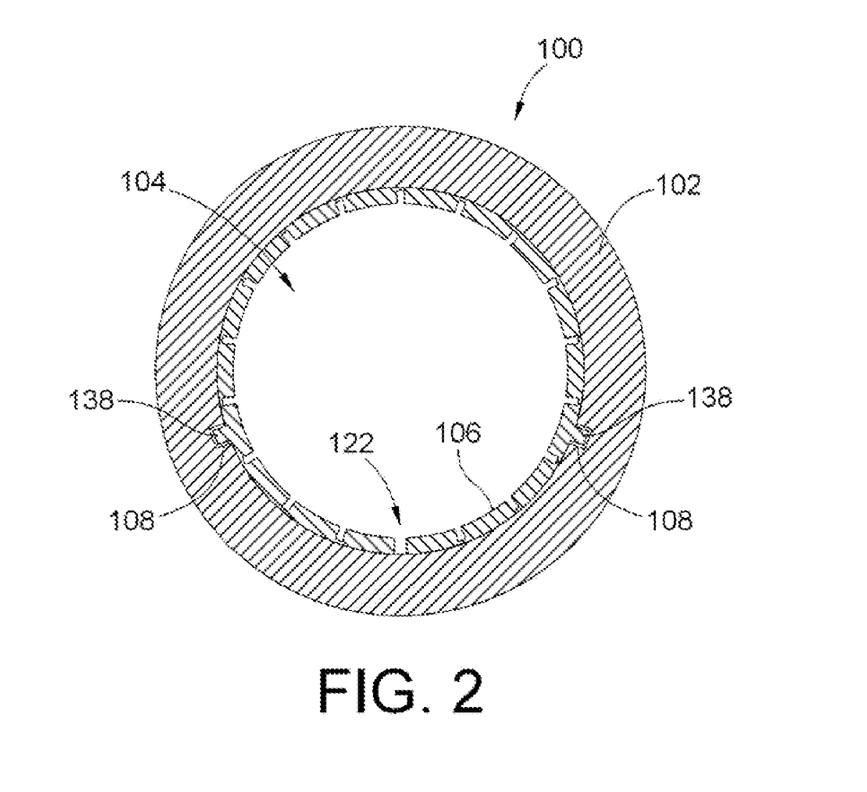
FIG. 2 is an orthographic cross-sectional view of the bearing arrangement of FIG. 1, taken through a pair of insert locking lugs of a snap-in polymer bearing insert.
Figure 3:
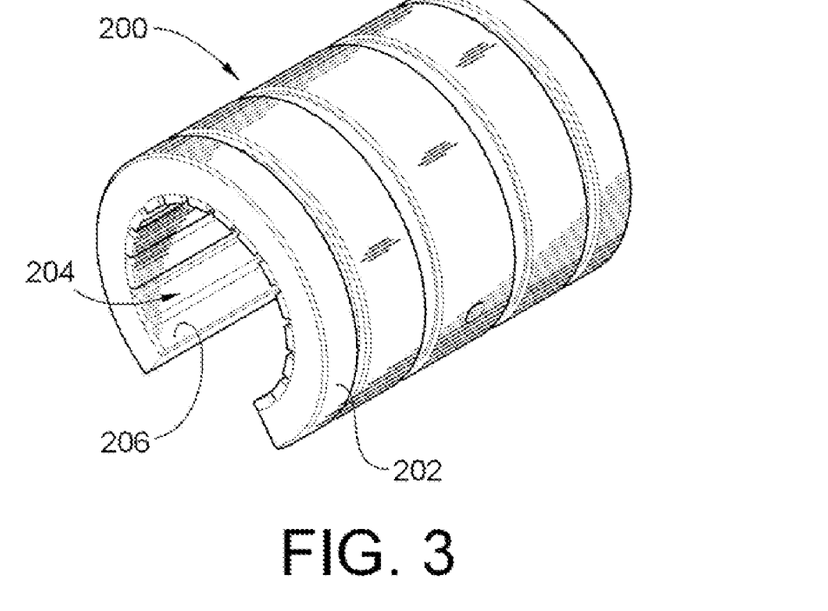
FIG. 3 is a perspective assembled view of a second exemplary embodiment of the invention, in the form of an open sliding bearing apparatus.
Figure 4:
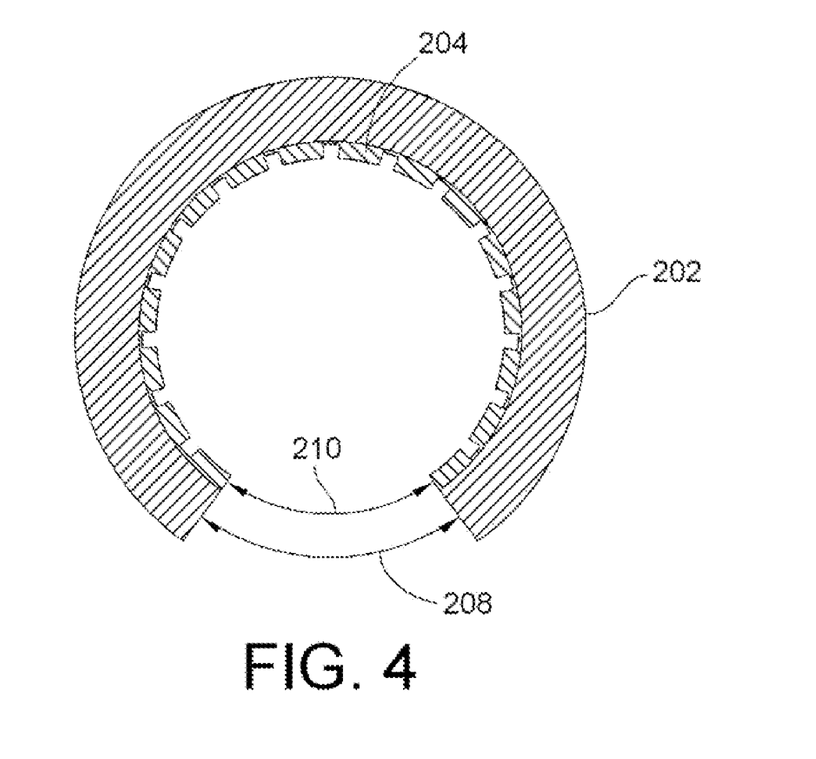
FIG. 4 is a cross-sectional view, taken through locating lugs of a bearing insert of the second exemplary embodiment of the invention shown in FIG. 3.
Figure 6:
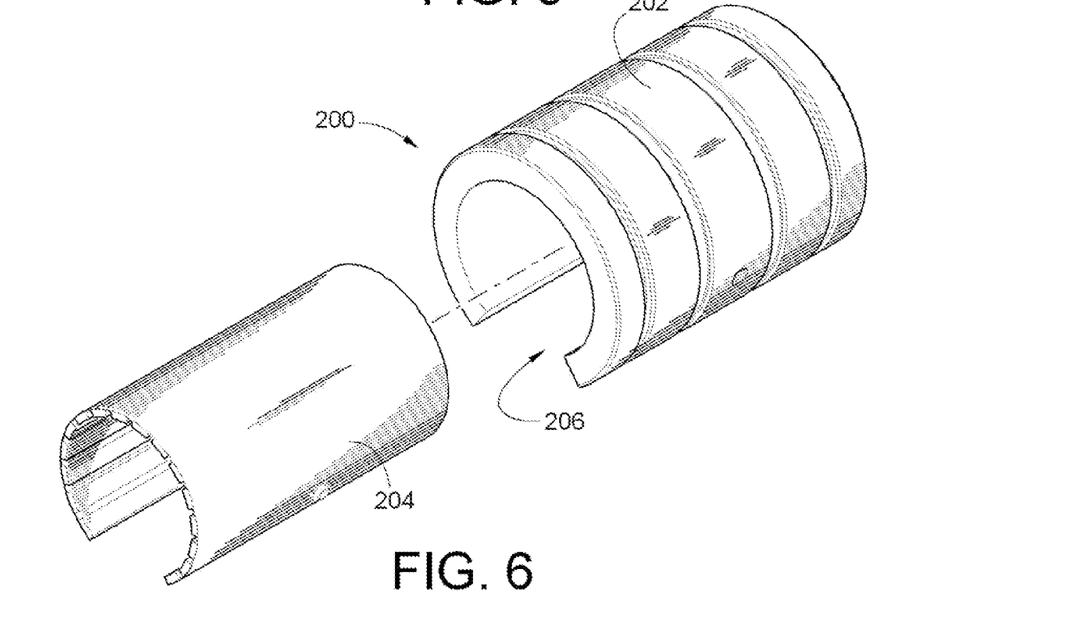
FIG. 6 is an exploded perspective illustration of the open bearing apparatus of FIG. 3.

FIGS. 3, 4 and 6, illustrate a second exemplary embodiment of a bearing apparatus 200, according to the invention, having a bearing housing 202 and a bearing insert 204, adapted for insertion into a substantially cylindrically shaped opening 206, within the housing 202. From a comparison of FIGS. 3, 4 and 6 to FIGS. 1, 2 and 5, it will be apparent, to those having skill in the art, that the embodiment shown in FIGS. 1, 2 and 5 illustrates a closed cylindrical bearing apparatus, whereas the embodiment shown in FIGS. 3, 4 and 6 illustrates an open bearing arrangement. It will be further understood, that the construction of the insert 204 and its interconnection with the housing 202, in the second embodiment of the invention, are substantially identical to the construction and connection described above with regard to the first exemplary embodiment of the invention shown in FIGS. 1 and 2.

Close inspection of the insert 204 of the second embodiment, as shown in FIG. 4, will reveal that two of the bearing segments, on either side of the longitudinally extending gap 122 of the first exemplary embodiment of the insert 104 have been removed on either side of the longitudinally extending gap 122, to form a wider longitudinally extending gap 210 which is oriented to correspond with an opening 208 in the bearing housing 202, of the second exemplary embodiment 200 of the invention.

Those having skill in the art will recognize, therefore, that the second exemplary embodiment of the insert 204 may be alternatively formed, in various embodiments, either as shown in FIG. 4, in a flat planar, cylindrical or non-cylindrical form, or may alternatively be fabricated by cutting away a portion of the first exemplary embodiment of an insert 106, according to the invention. Having such optional methods for producing the second exemplary embodiment of the insert 204 provides significant advantages in manufacturing flexibility and reductions in required inventory, to provide inserts for both closed and open bearing arrangements, according to the invention.

Figure 9:
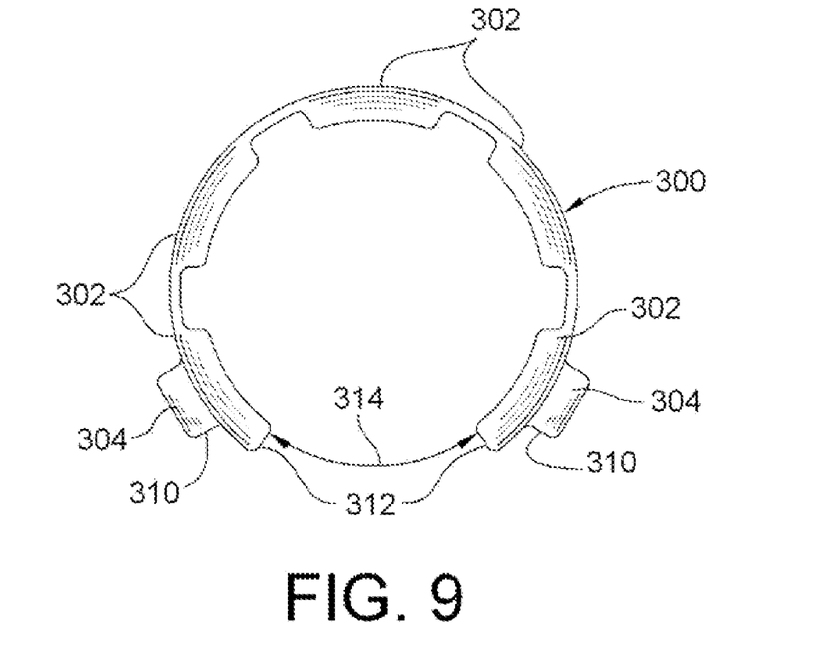
FIGS. 9 and 10 are end and side views, respectively, of a third exemplary embodiment of the invention, in the form of a bearing insert for an open sliding bearing apparatus, similar to the embodiment shown in FIG. 3.
Figure 10:
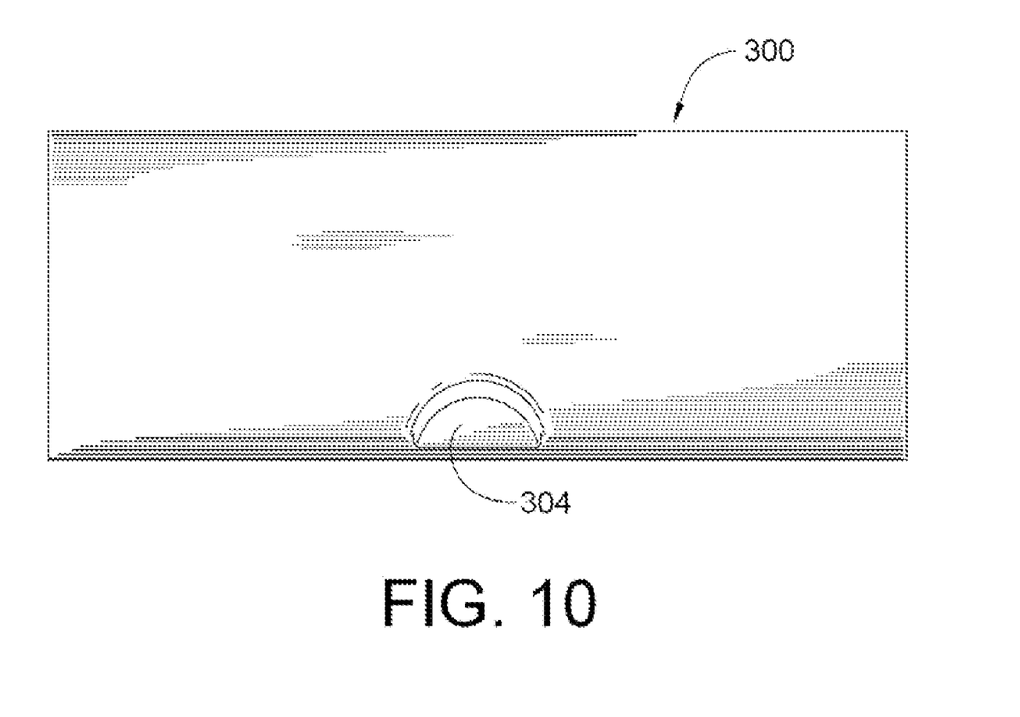

FIGS. 9 and 10 illustrate another embodiment of an insert 300, according to the invention, which is generally similar in configuration to the second exemplary embodiment of the insert 204 described above in conjunction with FIGS. 3, 4 and 6. The insert 300 has fewer bearing segments 302 than the first and second exemplary embodiments 106, 202 of the insert described above. As shown in FIGS. 9 and 10, the locking lugs 304 of the third exemplary embodiment of the insert 300 are semi-cylindrical shaped, with the flat sides 310 thereof facing longitudinal edges 312 of a longitudinally extending gap 314 in the insert 300. It will be further noted, that in the embodiment of the insert 300 shown in FIGS. 9 and 10, the locking lugs 304 extend from radially outer surfaces of a first and a second one of the bearing segments 302 disposed immediately adjacent to the longitudinally extending gap 314 and having longitudinally extending edges thereof defining the longitudinal edges 312 of the longitudinally extending gap 314. Those having skill in the art will recognize that a similar arrangement could be achieved in the embodiment of the insert 204 shown in FIG. 4, by removing an additional bearing segment on either side of the longitudinally extending gap 210 in the second exemplary embodiment of the insert 204.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bearing insert for a sliding bearing adapted for insertion into a substantially cylindrical longitudinally oriented opening in a bearing housing and for use with a shaft extending longitudinally through the cylindrical opening in the bearing housing and having a radius, an outer diameter, and a corresponding circumference thereof, the bearing insert comprising:
   a body of polymer material having a free-standing state when not inserted into the substantially cylindrical longitudinally oriented opening in the bearing housing;
   the body of polymer material also defining a longitudinal axis of the insert, first and second axially spaced axial ends of the insert, and first and second spaced longitudinal edges of the insert extending substantially parallel to the longitudinal axis of the insert;
   the body further defining a plurality of longitudinally extending bearing segments joined to one another by flexible webs;
   the bearing segments each defining a radially inner and a radially outer surface thereof;
   the radially inner surface of each of the bearing segments having a longitudinally extending radiused recess therein with the radius of the radiused recess substantially matching the radius of the shaft when the body of the bearing insert is in the free-standing state, and formed for slidingly bearing against a portion of the circumference of the shaft when the bearing insert is disposed within the cylindrical longitudinally oriented opening in the bearing housing and engaging the shaft;
   the radially outer surface of each of the bearing segments formed in such a manner that, when the insert is disposed within the cylindrical opening in the bearing housing, the radially inner surfaces of the bearing segments, in combination with one another, substantially define a circumferentially interrupted bore having an internal diameter substantially slidingly matching the outer diameter of the shaft, and such that the longitudinal edges of the insert form a longitudinally extending opening therebetween;
   the body further including at least one locking lug extending substantially radially outward from the radially outer surface of one of the bearing segments;
   each locking lug of the insert being configured for locking engagement with a corresponding depression in the bearing housing, to thereby lock the bearing insert in place against relative movement circumferentially and axially with respect to the bearing housing; and
   wherein, each locking lug has a substantially semi-cylindrical profile extending outward from the radially outer surface of the bearing segment, with a flat portion of the semi-cylindrical profile being aligned substantially parallel to and facing one or the other adjacent longitudinal edge.

2. The bearing insert of claim 1, wherein said at least one locking lug comprises a single locking lug, with the bearing segment from which the locking lug extends having a longitudinal edge thereof defining the first longitudinal edge of the insert.

3. The bearing insert of claim 1, wherein, the bearing segment from which at least one of the at least one locking lugs extends does not have a longitudinal edge thereof defining one of the longitudinal edges of the insert.

4. The bearing insert of claim 3, wherein:
   the bearing segment from which the at least one locking lug is attached is connected to adjacent bearing segments disposed between the bearing segment to which the locking lug is attached and one of the longitudinal edges of the insert; and
   at least one of the adjacent segments disposed between the one of the longitudinal edges and the bearing segment from which the locking lug extends are removable to form an open bearing insert having the longitudinal edges defined by distal edges of the remaining bearing segments.

5. The bearing insert of claim 3, wherein, the at least one locking lug is at least two locking lugs including a first locking lug and a second locking lug, identically configured to the first locking lug, the second locking lug extending from a second one of the bearing segments, with the second bearing segment from which the second locking lug extends not having a longitudinal edge thereof defining the second longitudinal edge of the insert, the second locking lug extending from a different bearing segment than the first locking lug.

6. The bearing insert of claim 5, wherein:
the first and second ones of the bearing segments are connected to adjacent bearing segments disposed between the first and second ones of the bearing segments and the longitudinal edges of the insert; and
the first and second ones of the bearing segments are configured and connected to the adjacent bearing segments disposed between the first and second ones of the bearing segments and the longitudinal edges of the insert in such a manner that at least one of the adjacent segments between the longitudinal edges and the first and second ones of the bearing segments are removable to form an open bearing insert having the longitudinal edges defined by distal edges of the remaining bearing segments.

7. The bearing of claim 1, wherein, the bearing insert substantially assumes a cylindrical form in the free-standing state, even when not inserted into the cylindrical opening in the bearing housing.

8. The bearing of claim 1, wherein, the bearing insert substantially assumes a non-cylindrical form in the free-standing state, when not inserted into the cylindrical opening in the bearing housing.

9. The bearing of claim 8, wherein, the bearing insert substantially assumes a flat planar form in the free-standing state, when not inserted into the cylindrical opening in the bearing housing.

10. A bearing insert for a sliding bearing adapted for insertion into a substantially cylindrical longitudinally oriented opening in a bearing housing and for use with a shaft extending longitudinally through the cylindrical opening in the bearing housing and having a radius, an outer diameter, and a corresponding circumference thereof, the bearing insert comprising:
a body of polymer material having a free-standing state when not inserted into the substantial cylindrical longitudinally oriented opening in the bearing housing;
the body of polymer material also defining a longitudinal axis of the insert, first and second axially spaced axial ends of the insert, and first and second spaced longitudinal edges of the insert extending substantially parallel to the longitudinal axis of the insert;
the body further defining a plurality of longitudinally extending bearing segments joined to one another by flexible webs;
the bearing segments each defining a radially inner and a radially outer surface thereof;
the radially inner surface of each of the bearing segments having a longitudinally extending radiused recess therein with the radius of the radiused recess substantially matching the radius of the shaft when the body of the bearing insert is in the free-standing state, and formed for slidingly bearing against a portion of the circumference of the shaft when the bearing insert is disposed within the cylindrical longitudinally oriented opening in the bearing housing and engaging the shaft;
the radially outer surface of each of the bearing segments being formed in such a manner that, when the insert is disposed within the cylindrical opening in the bearing housing, the radially inner surfaces of the bearing segments, in combination with one another, substantially define a circumferentially interrupted bore having an internal diameter substantially slidingly matching the outer diameter of the shaft, and such that the longitudinal edges of the insert form a longitudinally extending opening therebetween;
the body further including at least one locking lug extending substantially radially outward from the radially outer surface of one of the bearing segments;
each locking lug of the insert being configured for locking engagement with a corresponding depression in the bearing housing, to thereby lock the bearing insert in place against relative movement circumferentially and axially with respect to the bearing housing;
wherein, the at least one locking lug is at least two locking lugs including a first locking lug and a second locking lug, identically configured to the first locking lug, the second locking lug extending from a second bearing segments, with the second bearing segment from which the second locking lug extends having a longitudinal edge thereof defining the second longitudinal edge of the insert, the second locking lug extending from a different bearing segment than the first locking lug; and
wherein, the first locking lug has a substantially semi-cylindrical profile extending outward from the radially outer surface of the first one of the bearing segments, with a flat portion of the semi-cylindrical profile being aligned substantially parallel to and face toward the first longitudinal edge.

11. The bearing insert of claim 10, wherein, the second one of the bearing segments, from which the second locking lug extends, has a longitudinal edge thereof defining the second longitudinal edge of the insert.

12. The bearing insert of claim 11, wherein, the second locking lug has a substantially semi-cylindrical profile, identical to the semi-cylindrical profile of the first locking lug, extending outward from the radially outer surface of the second one of the bearing segments, with a flat portion of the semi-cylindrical profile being aligned substantially parallel to and facing the second longitudinal edge.

13. A bearing apparatus comprising:
a bearing housing having a cylindrical opening extending substantially longitudinally therethrough and a pair of identically configured depressions extending substantially radially outward from the cylindrical opening; and
a bearing insert adapted for insertion into the substantially cylindrical longitudinally oriented opening in the bearing housing and for use with a shaft extending longitudinally through the cylindrical opening in the bearing housing, with the shaft having a radius, an outer diameter, and a corresponding circumference thereof;
the bearing insert having a unitary body of polymer material having a free-standing state when not inserted into the substantially cylindrical longitudinally oriented opening in the bearing housing, the body also defining a longitudinal axis of the insert, first and second axially spaced axial ends of the insert, and first and second spaced longitudinal edges of the insert extending substantially parallel to the longitudinal axis of the insert;
the body further defining a plurality of longitudinally extending bearing segments joined to one another by flexible webs;
the bearing segments each defining a radially inner and a radially outer surface thereof;
the radially inner surface of each of the bearing segments having a longitudinally extending radiused recess therein with the radius of the radiused recess substantially matching the radius of the shaft when the body of the bearing insert is in the free-standing state, and formed for slidingly bearing against a portion of the circumference of the shaft when the bearing insert is disposed within the cylindrical longitudinally oriented opening in the bearing housing and engaging the shaft;

the radially outer surface of each of the bearing segments being formed in such a manner that, when the insert is disposed within the cylindrical opening in the bearing housing, the radially inner surfaces of the bearing segments, in combination with one another, substantially define a circumferentially interrupted bore having an internal diameter substantially slidingly matching the outer diameter of the shaft, and such that the longitudinal edges of the insert form a longitudinally extending opening therebetween;

the body of the bearing insert further including a first locking lug extending substantially radially outward from the radially outer surface of a first one of the bearing segments disposed adjacent the first longitudinal edge of the insert, and a second locking lug extending substantially radially outward from the radially outer surface of a second one of the bearing segments disposed adjacent the second longitudinal edge of the insert;

each of the first and second locking lugs being configured for locking engagement with a corresponding one of the depressions in the bearing housing, to thereby lock the bearing insert in place against relative movement radially and axially with respect to the bearing housing;

each one of the first and second locking lugs being configured for independently locking the bearing insert in place against relative movement circumferentially and axially with respect to the bearing housing; and wherein, the first and second locking lugs of the bearing insert and the corresponding depressions in the bearing housing have cooperative substantially semi-cylindrical profiles.

14. The bearing apparatus of claim 13, wherein, the bearing insert substantially assumes a cylindrical form in a free-standing state, even when not inserted into the cylindrical opening in the bearing housing.

15. The bearing apparatus of claim 13, wherein, the bearing insert substantially assumes a non-cylindrical form in a free-standing state, when not inserted into the cylindrical opening in the bearing housing.

16. The bearing apparatus of claim 15, wherein, the bearing insert body substantially assumes a flat planar form in a free-standing state, when not inserted into the cylindrical opening in the bearing housing.

17. The bearing apparatus of claim 13, wherein, the locking lugs of the bearing insert and the corresponding depressions in the bearing housing have cooperative substantially cylindrical profiles.

* * * * *